United States Patent [19]
Cullen et al.

[11] Patent Number: 5,009,308
[45] Date of Patent: Apr. 23, 1991

[54] CONTROLLED RATE ADSORBENT UNIT AND METHOD OF FABRICATION THEREOF

[75] Inventors: John S. Cullen, Buffalo; Samuel A. Incorvia, Tonawanda; Christopher S. Nigon, Orchard Park; Nicholas E. Vaylen, Grand Island, all of N.Y.

[73] Assignee: Multiform Desiccants, Inc., Buffalo, N.Y.

[21] Appl. No.: 391,775

[22] Filed: Aug. 9, 1989

[51] Int. Cl.$^5$ ............................................. B65D 81/26
[52] U.S. Cl. ..................................... 206/204; 55/275; 55/387; 53/440; 53/474; 206/444; 206/309
[58] Field of Search ............................ 55/387–389, 55/524, 275; 206/204, 444, 445, 309; 53/440, 474

[56] References Cited

U.S. PATENT DOCUMENTS

| | | | |
|---|---|---|---|
| 3,990,872 | 11/1976 | Cullen | 55/389 |
| 4,433,024 | 2/1984 | Elan | 428/198 |
| 4,488,645 | 12/1984 | Yamaguchi | 206/444 |
| 4,517,308 | 5/1985 | Ehlenz et al. | 502/401 |
| 4,614,528 | 9/1986 | Lennen | 55/387 |
| 4,654,057 | 3/1987 | Rhodes | 55/208 |
| 4,830,643 | 5/1989 | Sassa et al. | 55/389 |

FOREIGN PATENT DOCUMENTS

| | | | |
|---|---|---|---|
| 11890 | 1/1979 | Japan | 55/389 |
| 119418 | 9/1980 | Japan | 55/389 |
| 199020 | 1/1983 | Japan | 55/388 |
| 9880 | 1/1986 | Japan | 206/444 |
| 13529 | 3/1989 | Japan | 55/275 |
| 2173478 | 10/1986 | United Kingdom | 206/444 |

*Primary Examiner*—Bernard Nozick

[57] ABSTRACT

A controlled rate adsorbent unit including an adsorbent and a heat-shrunk casing of porous material having a predetermined water vapor transmission rate encasing the adsorbent for prolonging the water vapor adsorption time of the adsorbent. The controlled rate adsorbent unit may be in the shape of a recording disc or it may be in the shape of a three-dimensional solid with the heat-shrunk casing stretched tightly thereover. A method of fabricating a controlled rate adsorbent unit including the steps of providing an adsorbent material, heating the adsorbent material to dry off moisture therefrom, providing a porous material having a controlled water vapor transmission rate, sealing the adsorbent material in a casing of the porous material, heat-shrinking the porous material about the adsorbent, and storing the sealed adsorbent material in a moisture barrier package.

8 Claims, 2 Drawing Sheets

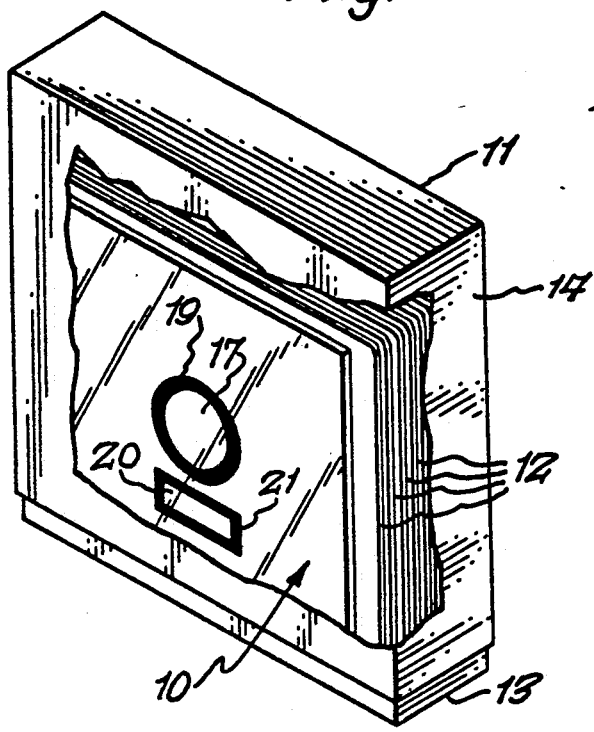
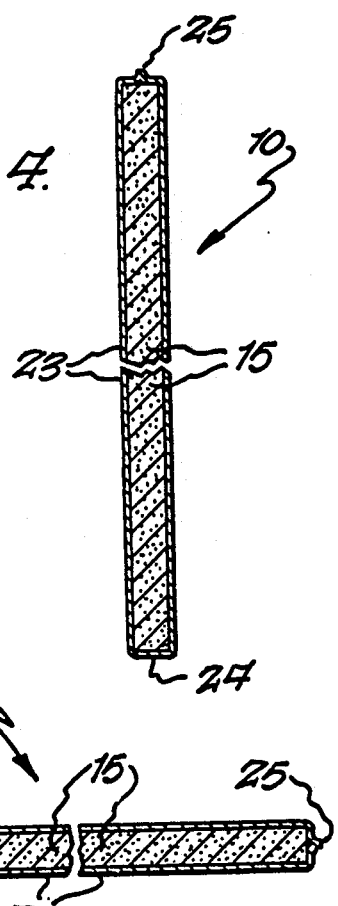
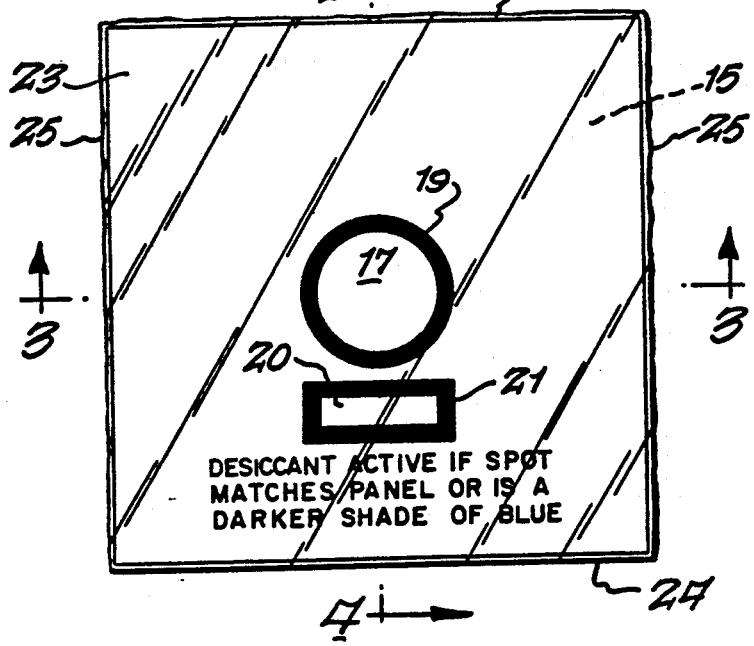

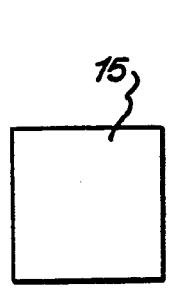
Fig. 5.
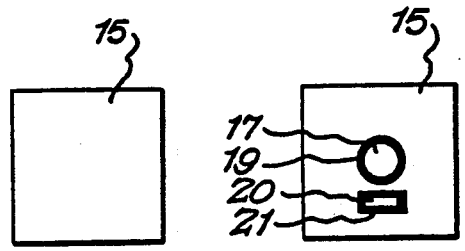
Fig. 6. Fig. 7.
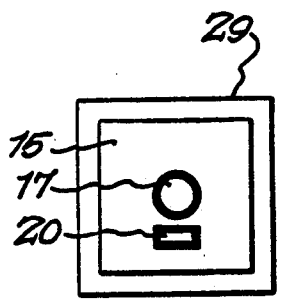
Fig. 8.
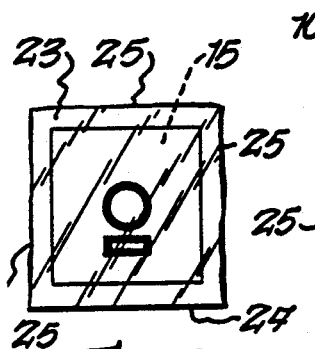
Fig. 9.
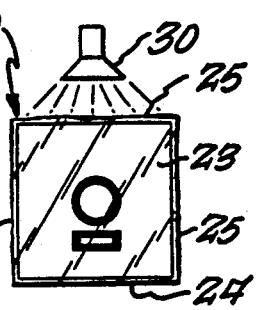
Fig. 10.
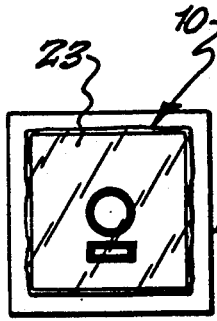
Fig. 11.
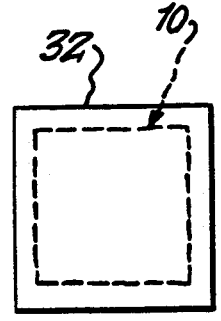
Fig. 12.
Fig. 13.
Fig. 14.
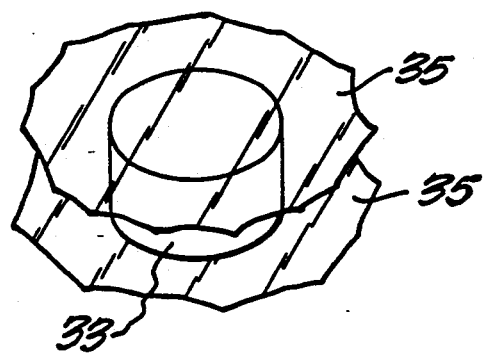
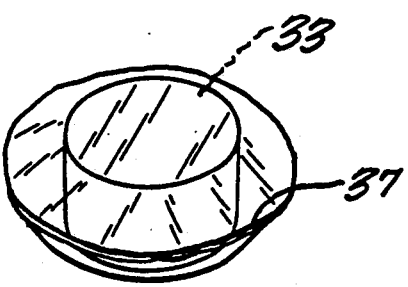
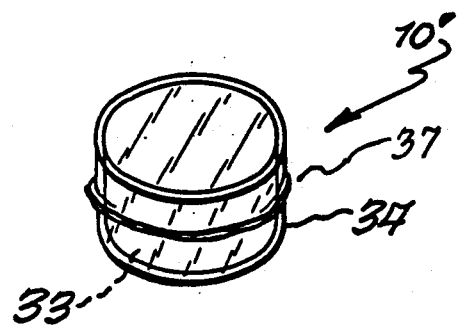
Fig. 15.

CONTROLLED RATE ADSORBENT UNIT AND METHOD OF FABRICATION THEREOF

BACKGROUND OF THE INVENTION

The present invention relates to a controlled rate adsorbent unit and to a method of fabrication thereof.

By way of background, the ability of recording discs of various types to record and play back accurately may be affected by moisture accumulating thereon during storage. Furthermore, it is desirable that any water vapor adsorbents which are used to maintain the discs in a relatively dry state should have certain features which enhance their utility. Also there may be situations where gases other than water vapor have to be adsorbed at a controlled rate.

SUMMARY OF THE INVENTION

It is accordingly one important object of the present invention to provide an improved controlled rate adsorbent unit which is approximately the size of a recording disc so that it can be packaged therewith; which has a controlled rate of water vapor adsorption so that it has a relatively long effective life; which confines any adsorbent dust therein to thereby prevent it from being deposited on the recording discs with which it is stored; and which may have a humidity indicator incorporated thereon for showing its condition.

Another object of the present invention is to provide an improved controlled rate adsorbent unit having a predetermined shape and which is encased in a conforming casing, the latter providing the controlled rate of vapor transmission to the adsorbent contained therein and which, by virtue of its conforming casing, provides a neat package.

A further object of the present invention is to provide a method for fabricating an adsorbent which will adsorb vapor at a controlled rate. Other objects and attendant advantages of the present invention will readily be perceived hereafter.

The present invention relates to a controlled rate adsorbent unit comprising an adsorbent having a predetermined shape, and a casing of porous material conforming to said predetermined shape and having a predetermined vapor transmission rate encasing said adsorbent for controlling the vapor adsorption rate of said adsorbent.

The present invention also relates to the combination of a package, recording disc means in said package, and a controlled rate adsorbent unit in said package for adsorbing water vapor in said package at a controlled rate for maintaining the quality of said recording disc means, said controlled rate adsorbent unit being in the shape of a recording disc.

The present invention also relates to a method of fabricating a controlled rate adsorbent unit comprising the steps of providing an adsorbent material having a predetermined shape, heating said adsorbent material to drive off moisture therefrom, providing a porous material having a controlled vapor transmission rate, and conforming said porous material to said predetermined shape in sealed relationship about said adsorbent.

The present invention also relates to a controlled rate adsorbent unit comprising at least one sheet of paper having adsorbent therein and having opposite sides, and a casing of controlled rate vapor transmission material in contact with said opposite sides of said sheet of adsorbent paper and sealing said sheet of paper and adsorbent therein.

The various aspects of the present invention will be more fully understood when the following portions of the specification are read in conjunction with the accompanying drawings wherein:

BRIEF DESCRIPTION OF THE DRAWINGS

FIG. 1 is a perspective view, partially broken away, of a package containing a plurality of floppy discs and a controlled rate adsorbent unit in the shape of a diskette for adsorbing water vapor within the package;

FIG. 2 is a plan view of the controlled rate adsorbent unit of the present invention;

FIG. 3 is a fragmentary cross sectional view taken substantially along line 3—3 of FIG. 2;

FIG. 4 is a fragmentary cross sectional view taken substantially along line 4—4 of FIG. 2;

FIGS. 5-12 depict the progressive steps which comprise the method of fabricating the controlled rate adsorbent unit of FIG. 2; and FIGS. 13-15 depict the steps in the method of providing a controlled rate adsorbent unit of a threedimensional shape rather than the planar shape of FIGS. 5-12.

DESCRIPTION OF THE PREFERRED EMBODIMENTS

The controlled rate adsorbent unit 10 of the present invention is for installation within package 11 containing one or more recording discs 12 which may be floppy discs, hard discs, compact discs or any other medium, the recording quality or play-back quality of which may be affected by moisture. It is the purpose of the controlled rate adsorbent unit 10 to remove the moisture from the package 11 at a controlled rate. Package 11 essentially includes two telescoping hollow rectangular parts, namely, inner part 13 and outer part 14. The bottom of outer part 14 is open to receive inner part 13, the top of which is open to receive recording discs 12 and adsorbent unit 10. Package 10 may be fabricated of vapor barrier material, and, if this is the case, the useful life of unit 10 may be extended, as the adsorbent unit 10 then need only adsorb moisture trapped inside of package 11 as a result of opening and closing it.

The controlled rate adsorbent unit 10 includes a sheet of desiccant paper 15 which is commercially available and which contains cellulose fiber with approximately two-thirds fine particles of dry silica gel desiccant. One side of paper 15 is printed at 17 with a humidity indicating substance, namely, cobalt chloride, which is confined within the black printed circle 19. Cobalt chloride is blue when the desiccant paper 15 is dry and turns pink when the desiccant paper 15 has adsorbed a predetermined amount of moisture. Also printed on paper 15 is a blue bar 20 within black outline 21. Blue bar 20 is strictly for providing a comparison for the cobalt chloride circle 17. The legend "Desiccant active if spot matches panel or is a darker shade of blue" is printed below panel 20. The use of the foregoing scheme for humidity indication is well known and by itself does not constitute a novel part of the present invention. While the unit 10 has been depicted with the humidity indicating material printed thereon, it will be appreciated that it need not be used, that is, the unit 10 can be used without it. In this event a separate humidity indicating card may be used in the package, if humidity indication is required or desired. A desiccant paper 15, which has been found satisfactory, is known under the trademark NATRASORB® SG-145, and is 54 mils thick and contains 44 grams of silica gel per square foot. However, any desired thickness of paper containing any desired amount of adsorbent or desiccant can be used, depending on requirements for its use.

A casing 23 confines a sheet of desiccant paper 15 therein. Casing 23, in the present instance, is a polyvinyl chloride film which has been shrunk-wrapped around desiccant paper 15. More specifically, casing 23 is fabricated by folding it along edge 24 and heat-sealing the remaining edges 25 to each other to thereby completely confine the desiccant paper 15 within casing 23. The PVC, after edges 25 have been sealed, is heat-shrunk to provide an extremely smooth surface to both sides of the controlled rate adsorbent 10. The casing 23 prevents dust from the silica gel from passing out of the casing and reaching the recording discs. If desired, a plurality of sheets of desiccant paper can be placed within a casing, to thereby increase the vapor adsorbing capacity of the unit 10.

The polyvinyl chloride casing 23 can have a broad range of vapor transmission, namely, 5 to 15 grams of water vapor per hundred square inches per day. The polyvinyl chloride may be of any desired thickness to obtain the desired rate of water vapor transmission. In the specific example shown, it is 50 gauge, but it can be up to 150 gauge, or, in fact, any thickness, depending on the desired rate of vapor transmission. The controlled rate of vapor transmission extends the shelf life of the adsorbent paper compared to the shelf life which would be obtained in the absence of the controlled rate. Thus, the adsorbent unit 10 can effectively dehumidify the package of discs in which it is placed. It will not lose its potency rapidly even if it is placed in an extremely humid environment.

The controlled rate adsorbent unit 10 is thus low profile for convenient installation in package 11. It is non-dusting so as not to adversely affect the recording media 12. In this respect, the casing 23 confines any dust from the dessicant. It is indicating to show its condition, namely, whether it is active or whether it is saturated with water. It adsorbs water vapor at a controlled rate to thereby not only prevent moisture from adversely affecting the recording media 12 but also to remain active for a relatively long time regardless of being placed in extremely humid environments. The controlled rate adsorbent unit 10 will remain active for approximately four weeks regardless of being placed in a high humidity environment. When the recording discs are placed in a package, such as 11, the latter will provide a certain barrier to transmission of water vapor to its inside, and thus the adsorbent unit 10 will only be subjected to the amount of water vapor within the package, which will result in an even longer life of the unit.

While the adsorbent paper has been described as containing silica gel, it will be appreciated that it can contain any suitable adsorbent, such as molecular sieve, clay, or calcium sulfate, by way of example and not of limitation. Furthermore, while the casing 15 has been described as polyvinyl chloride, it will be appreciated that it can be any type of film which has a desired vapor transmission rate, and it may include, without limitation, vinylidene chloride copolymer films, polystyrene, polypropylene or polyethylene terephthalate. Also, the casing may be material which has been microperforated, with the microperforations being of any desired size, and the term porous includes such structure.

The method of fabricating the specific controlled rate adsorbent unit 10 is depicted in FIGS. 5-12. The first step is to cut a piece of adsorbent paper 15 to size, as shown in FIG. 5. Thereafter, it is imprinted with the humidity indicator cobalt chloride 17 and the reference panel 20 as described above, as shown in FIG. 6. The next step is to subject the desiccant paper 15 to a heat source 27, as shown in FIG. 7, to dry it out. Normally this process comprises heating desiccant paper 15 for three hours at 300° F., but any other suitable drying procedure can be used. If the dried desiccant paper 15 is not to be immediately encased, it is then stored in a moisture barrier container 29 until it is needed, as shown in FIG. 8. In the foregoing respect, a plurality of dried desiccant papers 15 are stored within barrier container 29.

The next step in the process is to encase desiccant paper 15 within casing 23 by heat sealing opposite sides of the casing at heat sealed edges 25 after it has been folded along edge 24. Thereafter, the controlled rate adsorbent unit 10 is completed by heat-shrinking casing 23 by subjecting it to heat from source 30. This causes the casing 23 to substantially follow the contour of paper 15 substantially exactly and to cause unit 10 to have smooth glossy sides. Thereafter, unit 10 is stored in a vapor-barrier container 31, as shown in FIG. 11, until it is ready for final packaging. In this respect, a plurality of units 10 can be stored within container 31 which prevents moisture from reaching the finished unit 10. Thereafter, one or more controlled rate adsorbent units 10 are packaged within a barrier package 32 which may be metal foil or any other packaging material which will prevent moisture from reaching unit 10. Barrier container 32 may be the type which can be opened as required to remove one or more units 10.

In FIGS. 13-15 another type of controlled rate adsorbent unit 10' is disclosed. Unit 10' includes a solid three-dimensional adsorbent 33 which may be compressed molecular sieve which is encased in a heat-shrunk casing 34 of polyvinyl chloride, as described above, or any other suitable material which will provide a controlled rate of water vapor or gas transmission. In order to fabricate unit 10', two sheets 35 of polyvinyl chloride are placed on opposite sides of adsorbent 33 and thereafter they are heat sealed to each other along an edge 37. Thereafter, the package of FIG. 14 is subjected to heat to heat-shrink casing 34 so that it provides a tight wrap about adsorbent 33.

While the preferred manner of forming the controlled rate vapor transmitting casing described above in all embodiments is by heat shrinking, it will be appreciated that other methods of applying the conforming casing may be used as by stretch wrapping and shrink wrapping by methods other than heating. Also, where the geometry of the adsorbent permits, the controlled vapor transmission casing can be applied in conforming relationship to the adsorbent in any suitable manner.

While the adsorbent described above has been in the nature of a desiccant to adsorb water vapor from an environment at a controlled rate, it will be appreciated that the adsorbent can be of any desired adsorbent compound for adsorbing any undesirable gaseous or vaporous substance, and as noted above, it may be by way of example and not of limitation, carbon, potassium permanganate, ferrous salts/oxides, calcium and sodium hydroxides, or mixtures of suitable compounds. It will also be appreciated that in the claims the terminology vapor or vaporous substance includes any gas or vapor, and the only time that the claims are limited to water vapor is when this is specifically recited.

While preferred embodiments of the present invention have been disclosed, it will be appreciated that the present invention is not limited thereto but may be otherwise embodied within the scope of the following claims.

What is claimed is:

1. A method of fabricating a controlled rate adsorbent unit in the shape of a recording disc with which it is to be packaged comprising the steps of providing an adsorbent material consisting of paper impregnated with a moisture adsorbent and having a predetermined planar shape, heating said adsorbent material to drive off moisture therefrom, providing a plastic porous material having a controlled water vapor transmission rate, and conforming said plastic porous material to said predetermined planar shape and in completely sealed relationship thereto to produce said controlled rate adsorbent unit.

2. A method as set forth in claim 1 including the step of storing said controlled rate adsorbent unit in a moisture barrier package.

3. A method as set forth in claim 1 including the step of applying a humidity indicating material to said paper prior to sealing said adsorbent material in said porous material.

4. A controlled rate adsorbent unit for placement into a recording disc package in which recording discs are being stored comprising a sheet of paper impregnated with a moisture adsorbent, and plastic film casing means of porous material conforming to and completely encasing said sheet of paper and sealing said sheet of paper therein, said casing means having a predetermined water vapor transmission rate for controlling the water vapor adsorption rate of said moisture adsorbent so that exposure of said controlled rate adsorbent unit to high humidity atmospheric conditions will not prevent said adsorbent unit from remaining active for prolonged periods of time, and said adsorbent unit being substantially in the shape of a recording disc.

5. A controlled rate adsorbent unit as set forth in claim 4 including a humidity indicator on said sheet of paper.

6. A controlled rate adsorbent unit as set forth in claim 5 wherein said plastic film is transparent to permit viewing of said humidity indicator therethrough.

7. In combination: a package, recording disc means in said package, and a controlled rate adsorbent unit in said package for adsorbing water vapor in said package at a controlled rate for maintaining the quality of said recording disc means, said controlled rate adsorbent unit being in the shape of a recording disc, said adsorbent unit including paper impregnated with a moisture adsorbent and completely encased and sealed within a plastic casing having a predetermined vapor transmission rate.

8. The combination set forth in claim 7 wherein said package is fabricated of moisture barrier material.

* * * * *